No. 652,325. Patented June 26, 1900.
H. A. McKNIGHT.
LUNCH BASKET FOR BICYCLES.
(Application filed May 10, 1899.)
(No Model.)
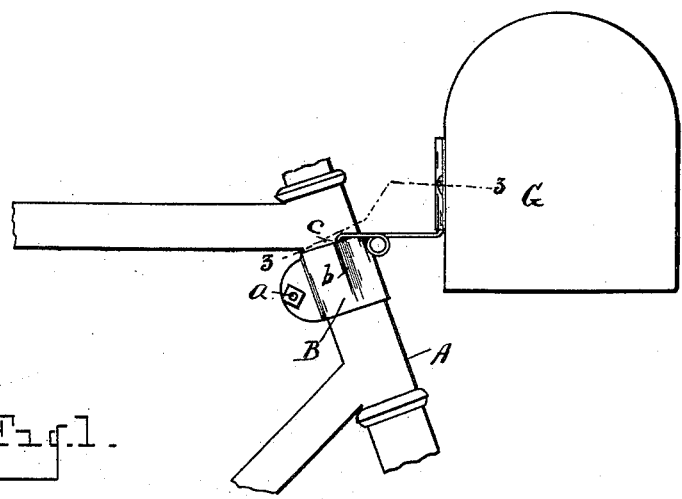
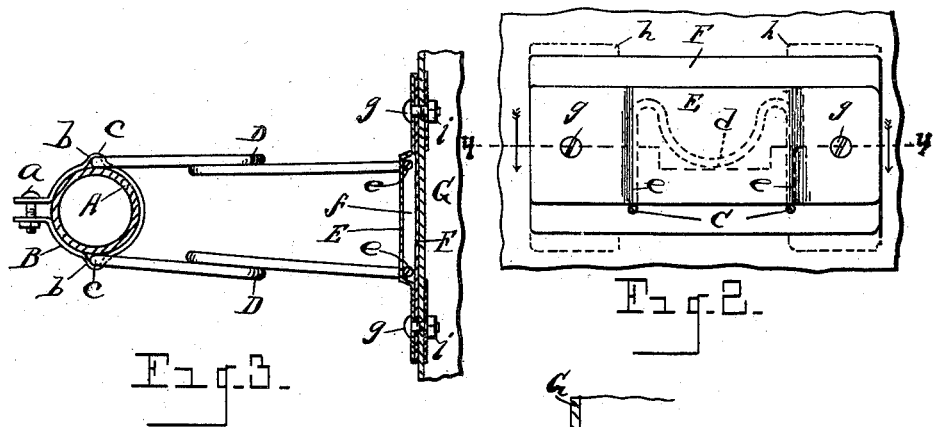
WITNESSES. INVENTOR.
Harry A. McKnight
Attorneys.

UNITED STATES PATENT OFFICE.

HARRY A. McKNIGHT, OF DETROIT, MICHIGAN.

LUNCH-BASKET FOR BICYCLES.

SPECIFICATION forming part of Letters Patent No. 652,325, dated June 26, 1900.

Application filed May 10, 1899. Serial No. 716,237. (No model.)

*To all whom it may concern:*

Be it known that I, HARRY A. MCKNIGHT, a citizen of the United States, residing at Detroit, in the county of Wayne, State of Michigan, have invented certain new and useful Improvements in Lunch-Basket Carriers for Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in lunch-basket carriers for bicycles; and it consists in the construction and arrangement of parts hereinafter fully set forth, and pointed out particularly in the claim.

The object is to provide simple and efficient means for supporting and carrying a lunch-basket upon the steering-head of a bicycle, the arrangement being such as to maintain the basket securely in place, to support said basket in a horizontal position, and to prevent the extreme vibration of the bicycle being imparted thereto. This object is attained by the device illustrated in the accompanying drawings, in which—

Figure 1 is an elevation of the steering-head of a bicycle-frame, other parts being broken away, showing my improved lunch-basket carrier attached thereto and supporting a lunch-basket. Fig. 2 is an elevation showing a portion of the side of a lunch-basket and the retaining-plates mounted thereon, which receive the bracket mounted on the head of the bicycle. Fig. 3 is a horizontal section as on line 4 4 of Fig. 2. Fig. 4 is a vertical section through a portion of the lunch-basket and through the attaching-plates.

Referring to the letters of reference, A designates the steering-head of a bicycle. B designates a circular metallic clamp adapted to embrace said steering-head and having a bolt *a* passing through the free ends thereof, by means of which said clamp is tightened upon the steering-head. Formed in the sides of said clamp are the vertical sockets *b*, adapted to receive the bent end portions *c* of the wire bracket C, which are adapted to be inserted in said sockets, as shown. Said bracket C is formed of a continuous strand of wire, comprising two arms having the loops D therein and united at their outer ends by the curved portion *d*, (shown by dotted lines in Fig. 2,) joining the upper ends of the upwardly-bent end portions *e* of said wire. The upwardly-extending end portions *e* of the bracket C are adapted to enter the slot *f*, formed between the opposed faces of the angle-plate E and the plate F, said plates being secured to the side of the lunch-basket G by means of the screw-bolts *g*, which pass through said plates, the side of the basket, and the inner plates *h*, receiving on their inner ends the nuts *i*, which bear against said inner plates. The inner plates *h* present such a bearing against the inner face of the wall of the lunch-basket as to prevent the screws from drawing therethrough, while the opposed plates E and F form between their adjacent faces a metal socket which receives the upwardly-turned end portions *e* of the bracket and prevent said bracket from injuring the wall of the basket. The socket *f* between said plates permits the engaging ends *e* of the bracket to be readily entered therein, so that the lunch-basket G, upon which said plates are mounted, may be readily secured upon the bracket or removed therefrom with equal facility. The bracket itself, if desired, may be detached from the bicycle by simply withdrawing the bent end portions *c* from their receiving-sockets *b* in the clamp B.

The coils D in the bracket absorb a great deal of the vibration from the bicycle and prevent the excessive jarring of the wheel from being transmitted to the lunch-basket G, thereby preventing a shaking up of the contents of said basket.

The curved portion *d* uniting the upwardly-turned ends of the bracket C serves to strengthen said upwardly-turned ends and affords a broad bearing for the engaging end of the bracket, which lies between the confining-plates on the basket, thereby holding the basket against lateral play and also preventing it from tilting.

Having thus fully set forth this invention, what is claimed is—

The combination of an angle-bracket, mounted on a bicycle and having its rightangle ends united by a downwardly-curved portion crossing between them, a basket or carrier having a flexible wall, a flat metal plate lying against the outer wall of said basket, an angle-plate lying upon said flat plate, said angle-plate being bent in the center to cause a portion of its wall to project beyond the plane of the remaining portion of the wall thereof so as to form an oblong socket between the projecting portion of the angle-plate and the flat plate upon which said angle-plate lies, said socket being adapted to receive the ends of the bracket and the transverse portion uniting said ends, the margins of said angle-plate extending laterally from said socket, a plate upon the inner wall of the basket opposite the outer plates, the bolts passing through the margins of the two outer plates beyond said socket, the wall of the basket and the plate upon the inner wall thereof, and the nuts or other fastening means upon the ends of said bolts bearing against the inner plate whereby said plates are clamped to the opposite sides of the interposed wall of the basket.

In testimony whereof I sign this specification in the presence of two witnesses.

HARRY A. McKNIGHT.

Witnesses:
E. S. WHEELER,
F. J. PEADIE.